United States Patent Office 3,600,291
Patented Aug. 17, 1971

3,600,291
METHOD OF PRODUCING DENSE CARBON FROM ANTHRACENE
Richard H. Wiley, New York, N.Y., assignor to the United States of America as represented by the United States Atomic Energy Commission
No Drawing. Filed Jan. 28, 1969, Ser. No. 794,761
Int. Cl. C07c 3/24
U.S. Cl. 204—162                               2 Claims

ABSTRACT OF THE DISCLOSURE

A process for producing dense carbon products comprising exposing organic compounds to coherent radiation of greater than 1.0 joule per millisecond.

PRIOR ART

The art has long sought methods of converting relatively low dense carbonaceous compounds into high density carbon products such as crystalline carbon and diamonds. The high pressures and temperatures required by conventional methods have rendered such processes uneconomical.

French Pat. No. 1,370,722, R. Rocherolles, issued July 20, 1964, discloses a process wherein graphite is encased in molten glass, cooled, and thereafter exposed to laser energy to effectuate the conversion. The encapsulation of the reactants and subsequent de-encapsulation required by the process cause many technological problems.

It is an object of this invention to provide those skilled in the art with a relatively simple process for converting relatively low density carbonaceous material to crystalline high density carbon products.

SUMMARY OF THE INVENTION

The invention described herein was made in the course of, or under a contract with the United States Atomic Energy Commission.

I have discovered a process for producing dense carbon products comprising subjecting carbon compounds containing at least one atom per molecule from the group consisting of oxygen, hydrogen, and nitrogen to at least one joule of energy from a focused laser beam until carbon products having the desired crystallinity and density are formed. By dense carbon products I mean greater than pure graphite such as diamonds, and other crystalline or dense carbon products.

DETAILED DESCRIPTION OF THE INVENTION

The carbon compounds which are exposed to laser irradiation in my process can be any carbon compound which contains hydrogen, oxygen, and/or nitrogen in its molecular makeup. The carbon compound can be a mixture of compounds or it can be in the pure state. The carbon compound to be irradiated can be a mixture of compounds or it can be in the pure state. The carbon compound to be irradiated can be in the gaseous, liquid and/or solid state during the irradiation.

The following is an illustrative list of chemical compounds from which dense carbon compounds have been produced in accordance with the process disclosed herein: methane, ethane, butane, ethylene, cyclopropane, benzene, toluene, p-xylene, mesitylene, biphenyl, naphthalene, anthracene, phenanthrene benzoic acid, benzil, anthraquinone, N,N-dimethylaniline, N,N-diethylaniline, methyl yellow, methylene blue. In the preferred embodiment of my invention, I use anthracene as the carbon compound to be converted to dense carbon.

Any source of coherent radiation capable of delivering energy to the carbon compounds at a rate greater than 0.1 joule per millisecond can be used in carrying out my novel process. The amount of dense carbon products produced is directly proportional to the rate and amount of coherent radiation to which the carbon compounds are subjected. Laser systems are ideal sources of coherent radiation for my process. Carbon dioxide gas lasers, neodymium glass rod lasers, and ruby crystal lasers can be conveniently employed in the practice of my invention.

The carbon compounds which are to be exposed to coherent radiation should be contained in a vessel composed of suitable optical material in order that the vessel material itself will not absorb the radiation energy.

The vessel should be constructed of material having a window which is transparent to the wavelength of the radiation used. Exemplary of materials which may be used in construction of the vessel are: quartz, glass, fluorspar, fused salt (NaCl) and Lucite. Cells constructed with plane parallel (flat) sides or curved (cylindrical) sides are used.

EXAMPLE

Materials used for irradiation

All compounds used were obtained commercially. The solids, biphenyl, naphthalene, anthracene, phenanthrene, anthraquinone, methyl yellow, benzil and benzoic acid were purified by recrystallization. The liquids benzene, toluene, p-xylene, mesitylene, N,N-dimethylaniline and N,N-diethylaniline were freshly distilled before use.

Laser irradiation of samples

The laser used was a six inch ruby pumped with two xenon flash tubes in a double-elliptical cavity with water cooling. The housing for this instrument was so designed as to eliminate substantially all stray flash lamp light from reaching the target. The beam wavelength was 6943 A.

All the samples tested for this example were exposed to only one burst of the laser at a beam intensity of 3.5±0.5 joules. Other samples exposed to single bursts of a beam intensity of 10.0±0.5 and up to 40 joules produced results substantially similar to those shown in the table.

Pyrex capillary tubes, 8 cm. long, having an outside diameter of 3 mm. and an inside diameter of 2 mm. were used to hold the samples during the irradiation. The tubes were cleaned with chromic acid cleaning solution and distilled water and were dried at 120° C. prior to use. Each tube was sealed at one end. Each tube was charged with 5–10 mg. of the sample and was stoppered with a serum bottle (needle puncture) rubber stopper.

A series of samples of naphthalene and of benzene were run under prepurified nitrogen and a series of anthracene was run under hydrogen and oxygen. They showed no marked difference in relative amounts of products formed. The data for these runs are also given in the table.

The solid samples were packed firmly into the bottom of the tube with a metal rod. For the liquid samples, the stoppered tube containing the sample was immersed in liquid nitrogen to freeze the sample immediately before irradiation. Gaseous samples were exposed in Pyrex cells having flat sides and with a volume of about 3 ml.

The laser beam was focused with a 8.4 cm. focal length lens on the sample. The lens and the sample holder were mounted in an optical bench and the focal point was located by observing the size of the hole burned in a target. A minimum diameter of about 1 mm. was burned at the apparent focal point.

The dense carbon particles produced in this example were separated from graphite and other less dense carbon by suspension in bromoform using techniques described by Wentorf Adv. Chem. Phys. 9, 370 (1965) and by U.S. Pat. No. 3,305,331, issued to K. Inano, Feb 21, 1967, entitled "Method of Making Diamond-Faced Articles." The dense carbon particles are heavier than bromoform and settle to the bottom on standing. The graphite and less dense particles rise to the top. The separation was facilitated by degassing the material to remove adsorbed gases which alter the true density and by treatment with ion or electric sources to preclude or destroy colloid formation. The separation was also facilitated by centrifugation. The upper layer and suspended solids were separated by decantation or by continuous centrifugation.

Alternative separation, and identification, methods such as the dissolution of the graphite in red fuming nitric acid or chromic acid as described in U.S. Pat. No. 2,941,248, issued to H. T. Hall, June 21, 1960, entitled "High Temperature High Pressure Apparatus" and U.S. Pat. No. 3,030,187, issued to W. G. Eversole, Apr. 17, 1962, entitled "Synthesis of Diamond," are less useful. The dense carbon may be used as nuclei for the growth of larger crystals of dense carbon as described in U.S. Pat. No. 3,030,188, issued to W. G. Eversole, Apr. 17, 1962, entitled "Synthesis of Diamond."

Final confirmation of the non-graphite crystal structure is made by electron or X-ray diffraction measurements as described in U.S. Pat. No. 3,030,187.

The results of the above tests showed that dense carbon products having a density greater than that of graphite were produced by the procedures shown in the example.

The dense carbon material is useful in construction of graphite modulated atomic reactor of space saving design. The neutron capture cross-section of the dense carbon is determined by standard procedures.

What is claimed is:

1. A process for producing dense carbon particles comprising subjecting anthracene to at least one joule of energy from a laser beam having a wavelength of 6943 A. until dense carbon particles are produced.

2. The process of claim 1 wherein the anthracene is subject to one burst of the laser beam at a beam intensity of $3.5 \pm 0.5$ joules.

References Cited

UNITED STATES PATENTS

| 3,125,498 | 3/1964 | Bartok et al. | 204—162.1 |
| 3,262,122 | 7/1966 | Fleisher et al. | 219—121L |

FOREIGN PATENTS

| 1,370,722 | 7/1964 | France. | |

CARL D. QUARFORTH, Primary Examiner

E. E. LEHMANN, Assistant Examiner

U.S. Cl. X.R.

204—162HE, 219—121L